(12) United States Patent
Mitamura et al.

(10) Patent No.: US 6,474,968 B1
(45) Date of Patent: Nov. 5, 2002

(54) VULCANIZER

(75) Inventors: Hisashi Mitamura; Yasuhiko Fujieda, both of Takasago; Hirohiko Fukumoto; Kazuto Okada, both of Kobe, all of (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/662,867

(22) Filed: Sep. 15, 2000

(30) Foreign Application Priority Data

Sep. 17, 1999 (JP) .............................. 11-262850

(51) Int. Cl.[7] .............................................. B29C 35/02
(52) U.S. Cl. ............................... 425/40; 425/42; 425/46
(58) Field of Search .............................. 425/40, 41, 42, 425/46

(56) References Cited

U.S. PATENT DOCUMENTS

| 3,924,981 | A | * | 12/1975 | Sarumaru | 425/41 |
|---|---|---|---|---|---|
| 4,553,930 | A | * | 11/1985 | Cox et al. | 425/40 |
| 4,728,274 | A | * | 3/1988 | Siegenthaler | 425/41 |
| 5,186,951 | A | * | 2/1993 | Siegenthaler | 425/40 |
| 5,683,643 | A | * | 11/1997 | Laurent | 425/41 |

* cited by examiner

*Primary Examiner*—James P. Mackey
(74) *Attorney, Agent, or Firm*—Oblon, Spivak, McClelland, Maier & Neustadt, P.C.

(57) ABSTRACT

A vulcanizer includes a vulcanizer body for heating a green tire by making use of heat quantity to vulcanize an mold it and repetitiously using the heating medium used for the vulcanizing and molding for heating. A heat quantity supplementing device heats the heating medium to thereby supplement a lost part of the heat quantity of the heating medium. Thereby, vulcanizing and molding can be carried out with less energy loss of the heating medium.

14 Claims, 9 Drawing Sheets

VULCANIZER

BACKGROUND OF THE INVENTION 1. (Field of the Invention)

The present invention relates to a vulcanizer for vulcanizing and molding a green tire.

2. (Description of the Related Art)

The procedure for vulcanizing and molding a green tire comprises heating a mold by a heating medium, supplying a high temperature and high pressure heating medium to an internal space of the green tire charged into the mold, thereby pressing, while heating an inner wall surface of the tire, the inner wall surface in a direction of the mold. Vulcanizing is carried out by heating the green tire from inside and outside thereof by the heated mold and the heating medium in the internal space of the green tire.

For the heating medium used for the vulcanizing and molding as described above, vapor that can be prepared easily by a boiler can be used. Accordingly, a design has been heretofore employed in which a boiler is installed internally or externally of a building, and the boiler and a vulcanizer are connected through a piping whereby vapor prepared by the boiler is supplied to the vulcanizer through the piping. Where vulcanizing and molding are carried out by a plurality of vulcanizer, vulcanizers 111 use one boiler 112 in common, as shown in FIG. 9, and therefore, the main boiler 112 and each of the vulcanizers 112 are connected while branching a piping 113, and vapor prepared by the main boiler 112 is supplied while distributing it to the vulcanizers 111.

However, the conventional constitution as described above poses a problem that when the vapor is supplied from the main boiler 112 to the vulcanizers 111 through the piping 113, the greater part of quantity of heat of the vapor is lost due to the radiation of the piping 113, resulting in a great loss of energy. Particularly, where a plurality of vulcanizers 111 use one boiler 112 in common, since the length of the piping is long, the energy loss caused by the radiation of the piping 113 is extensive. When the design is employed in which the vapor from the boiler 112 is supplied to the vulcanizers 111 through the piping 113, when the vulcanizers 111 are intended to be transferred to other places, the transfer work for the vulcanizers 111 as well as the work for the piping 113 are necessary, thus posing a problem that the layout of factory cannot be changed easily. Further, where vulcanizing equipment is newly installed, it is necessary to install the main boiler 112 along with the vulcanizers 111, thus posing a problem that even small-scaled vulcanizing equipment for carrying out vulcanizing and molding by less number of vulcanizers 111 requires high cost.

SUMMARY OF THE INVENTION

It is an object of the present invention to provide a vulcanizer capable of carrying out vulcanizing and molding with a small energy loss of a heating medium.

It is a further object of the present invention to provide a vulcanizer capable of being transferred and capable of newly installing vulcanizing facilities at less cost.

The vulcanizer according to the present invention comprises a vulcanizer body for heating a green tire making use of quantity of heat of a heating medium to vulcanize and mold it, and repetitively using the heating medium used for the vulcanizing and molding for the purpose of heating, and heat quantity supplementing means for supplementing a lost part of the heat quantity of the heating medium by heating the heating medium. According to this, it is not necessary to receive a supply of a heating medium a boiler disposed in a place separately from the vulcanizer through a piping, and therefore, no energy loss caused by radiation of a piping in the middle of the supply occurs, and vulcanizing and molding can be carried out with small energy loss of the heating medium. Further, since no boiler and piping are necessary, the vulcanizer can be transferred easily, and the vulcanizing facilities can be newly installed at less cost.

In the above-described vulcanizer, the heat quantity supplementing means may comprise a circulating channel for removing the heating medium used for the vulcanizing and molding outside from the vulcanizing body to return it to the original place, and a first heater for heating the heating medium which flows in the circulating channel. According to this, the circulating channel and the first heater are assembled separately from the vulcanizer body, and afterward, are mounted on the vulcanizer body, thus making it possible to easily mount it on the existing vulcanizer body.

In the above-described vulcanizer, the vulcanizer body comprises a mold into which the green tire is charged, and a platen plate for heating the mold by receiving the heating medium, and the heat quantity supplementing means may have a second heater connected to the platen plate to heat the heating medium through a diaphragm of the platen plate. According to this, since the heating medium within the platen plate is heated by the second heater connected to the platen plate, the heating medium can be heated efficiently to supplement a lost part of the heat quantity.

In the above-described vulcanizer, the vulcanizer body comprises a mold into which the green tire is charged, and a platen plate for heating the mold by receiving the heating medium, and the heat quantity supplementing means may have a third heater provided in the receiving space of the heating medium to directly heat the heating medium. According to this, since the heating medium within the platen plate is heated directly, the heating medium can be heated very efficiently to supplement a lost part of the heat quantity.

In the above-described vulcanizer, the vulcanizer body comprises a mold into which the green tire is charged, and a bladder for pressing, when the green tire is vulcanized and molded, the inner wall surface of the green tire in a direction of the mold, the bladder being preferably formed of a low orientation material. According to this, even if vulcanizing and molding are repeated, since the low orientation material for the bladder is hard to be deteriorated under the circumstances of high temperature, the low orientation material maintains its initial properties, and even if the vulcanizing and molding are repeated increasingly, the bladder can be used for a long period.

A vulcanizer according to the present invention comprises a vulcanizer body for heating a green tire by making use of heat quantity of a heating medium to vulcanize and mold it, a mold into which the green tire is charged, an upper platen plate for heating the mold from the lower side thereof by receiving the heating medium, a lower platen plate for heating the mold from the upper side thereof by receiving the heating medium, first heat quantity supplementing means for elevating the upper platen plate to the desired temperature, second heat quantity supplementing means for elevating the lower platen plate to the desired temperature, said first and second heat quantity supplementing means respectively comprising a circulating channel for removing the heating medium used for vulcanizing and molding outside from the vulcanizing body to return it to the original place, and a heater provided in the circulating channel to supplement a lost part of heat quantity of the heating medium by heating the heating medial which flows in the circulating channel. In the above-described vulcanizer, the mold comprises an upper side mold, a lower side mold, and a split mold, the vulcanizer comprising a third heat quantity supplementing means for elevating a fixed ring provided on the split mold to the desired temperature, the third heat quantity supplementing means comprising a circulating channel for removing the heating medium used for vulcanizing and molding outside from the vulcanizing body to return it to the original place, and a heater provided in the circulating channel to supplement a lost part of heat quantity of the heating medium by heating the heating medial which flows in the circulating channel. According to this, no energy loss caused by the radiation of the piping in the middle of supply occurs, and vulcanizing and molding can be carried out with small energy loss of the heating medium. Since no boiler and piping are unnecessary, the vulcanizer can be transferred easily, and the vulcanizing facilities can be newly installed at low cost. Further, the vulcanizing channel and the heater are assembled separately from the vulcanizer body, and afterward, can be mounted on the vulcanizer body, and therefore can be mounted easily on the existing vulcanizer body also.

In the above-described vulcanizer, an induction heating coil may be provided in the outer perpheral direction of the split mold. According to this, an intensive high frequency magnetic field is applied to a tread part of a green tire to thereby preferentially induction-heat a belt member provided internally of the tread part, and therefore, in a bead part having a great wall-thickness and a tread part, heating is carried out internally of the tire, thus enabling elevation of the whole tire to the desired temperature in a short period of time.

In the above-described vulcanizer, a plurality of magnetic members may be provided on the surface of the bladder. Further, an induction heating coil may be arranged internally of the bladder. According to this, since the intensive high frequency magnetic field is applied to the magnetic members of the bladder to generate heat in the bladder itself, and therefore, the delay of the transmission time of the heat quantity by the bladder is suppressed to the minimum, because of which the green tire can be elevated to the vulcanizing temperature in a further short period of time.

DESCRIPTION OF THE PREFERRED EMBODIMENTS

Figure 1:
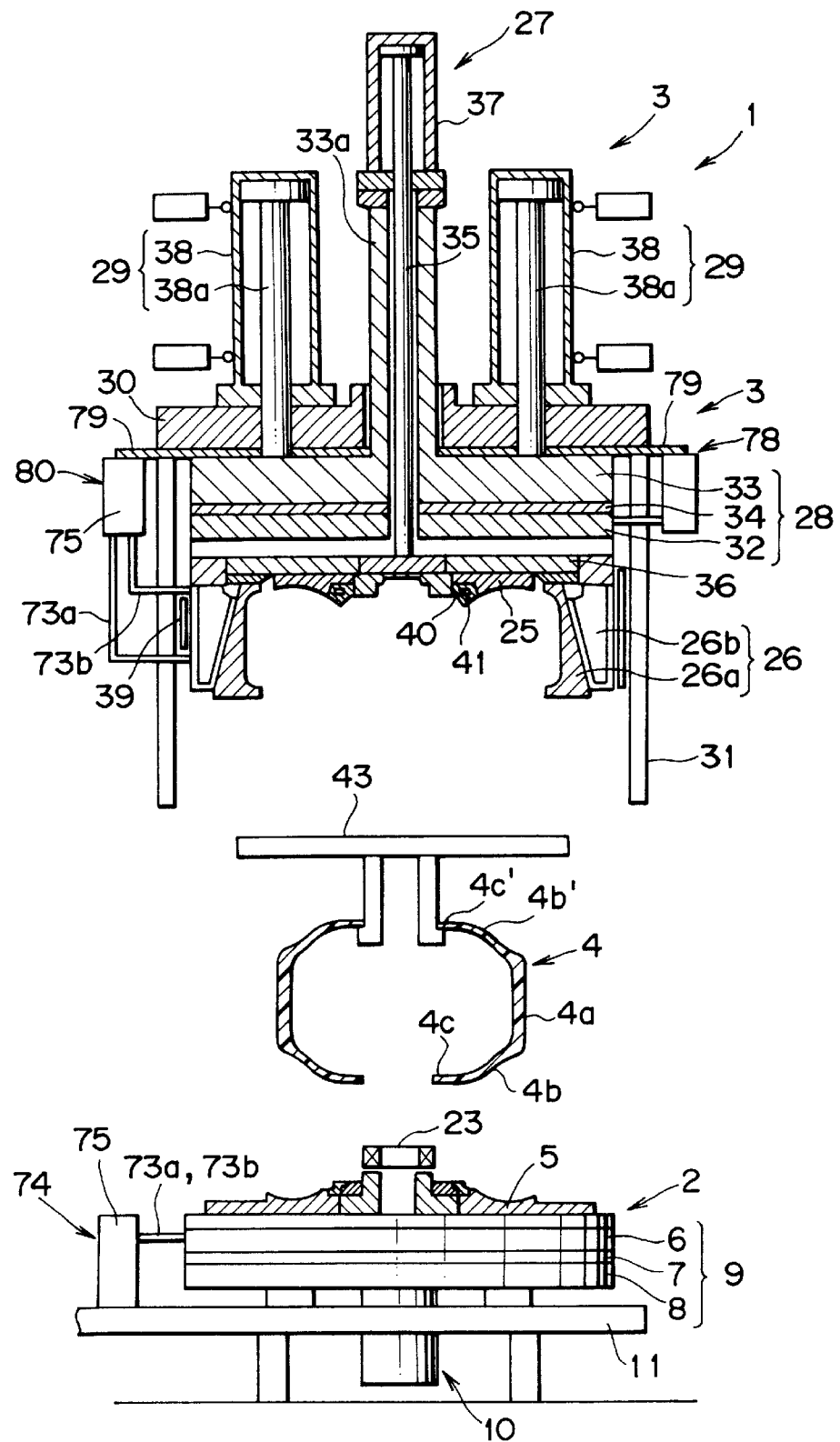
FIG. 1 is an explanatory view showing a state for carrying in a green tire.

The embodiments of the present invention will be described hereinafter with reference to FIGS. 1 to 8. A vulcanizer according to the present embodiment has, as shown in FIG. 1, a mold fixing part 2 set to a predetermined height position, and a mold elevating part 3 which elevates with respect to the mold fixing part 2. The mold fixing part 2 has a lower side mold 5 in contact with a lower side wall 4b of a green tire 4, a lower heating mechanism 9 for heating the lower side mold 5 to a predetermined temperature, a center mechanism 10 extending through a center part of the lower heating mechanism 9 and the lower side mold 5, and a base frame 11 for supporting the center mechanism 10 and the lower heating mechanism 9.

Figure 5:
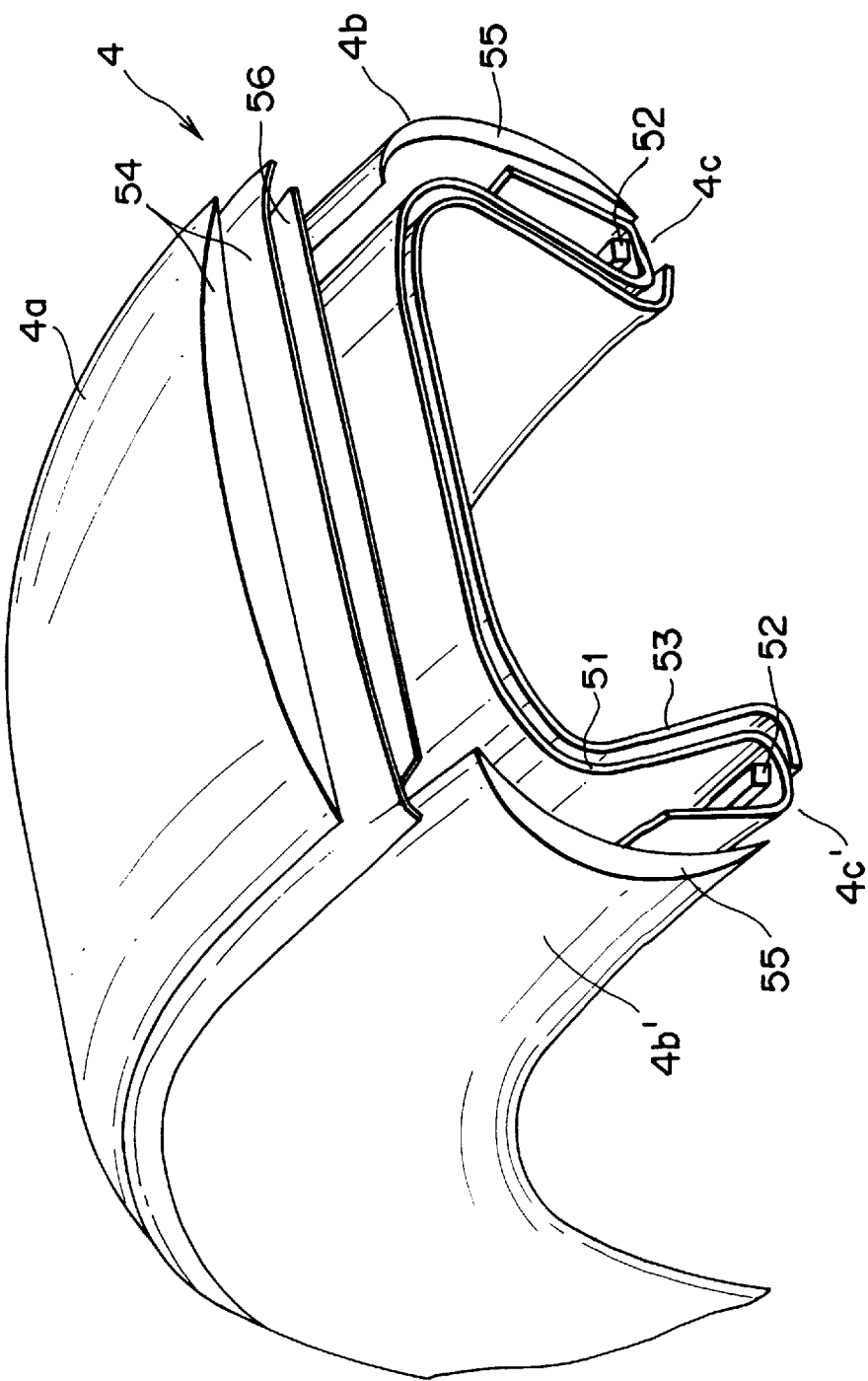
FIG. 5 is an exploded perspective view showing main parts of a green tire.

The green tire 4 has, as shown in FIG. 5, a carcass assembly 51 both ends of which are bent, a bead wire 52 made of metal provided on the bent part of the carcass assembly 51, an inner line 53 made of rubber attached to the inner peripheral surface of the carcass assembly 51, a tread member 54 and a side wall member 55 made of rubber attached to the outer peripheral surface and the side peripheral surface, respectively, of the carcass assembly 51, and a belt member 56 made of metal provided between the side wall member 55 and the carcass assembly 51 to thereby provide a constitution in which metal members (a bead wire 52, and a belt member 56) are provided internally of the tire of a great wall-thickness tread part 4a and bead parts 4c and 4c'.

Figure 2:
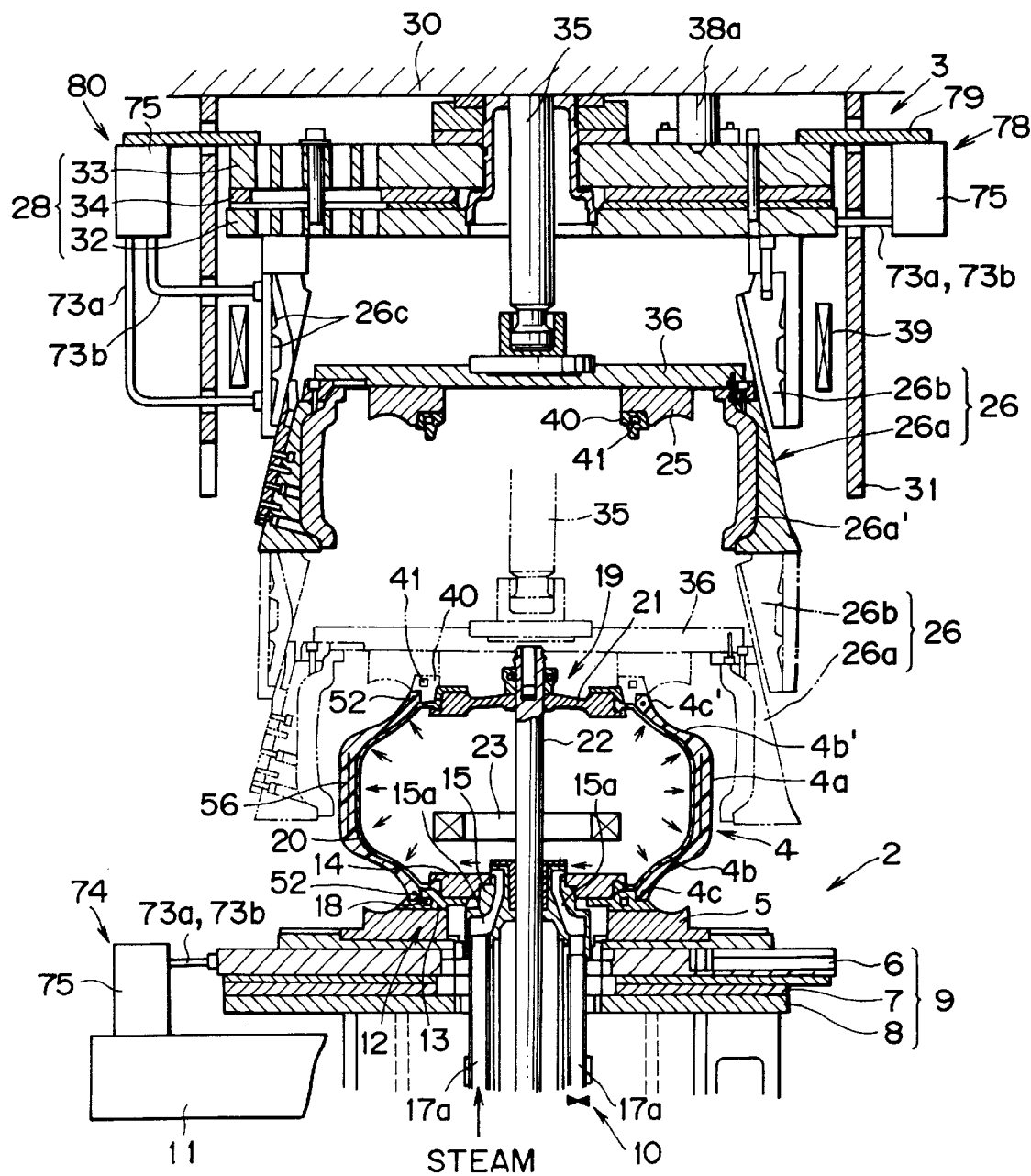
FIG. 2 is an explanatory view showing a clamping state.

As shown in FIG. 2, the lower heating mechanism 9 of the mold fixing part 2 has a disk-shaped lower platen 6 for supporting the lower side mold 5 in a face-like manner. As shown in FIG., 4, the lower platen 6 has a disk-shaped platen body 71, and a lid 72 joined liquid-tightly to one surface of the platen body 71. One surface of the platen body 71 is formed with a heating medium groove 71a. The heating medium groove 71a is formed over the whole surface of the platen body 71 by repeating the form in which the groove 71a is formed in a radial direction from the outer peripheral surface to the inner peripheral side of the platen body 71 and afterward bent on one side in a peripheral direction, and further formed in a radial direction from the inner peripheral side to the outer peripheral side and afterward bent on one side in a peripheral direction. One side and the other side of the heating medium groove 71a are opened outside from the side of the platen body 71 at a position close to each other. With this, the heating medium groove 71a of the platen body 71 and the lid 72 are formed internally of the lower platen 6 with a receiving space in which one end and the other end of the heating medium groove 71a serve as a supply port 71b and a discharge port 71c for a heating medium. For the heating medium, an inactive gas such as vapor and nitrogen gas and oil can be applied.

On the lower platen 6 is provided a first heat quantity supplementing device 74 for supplementing a lost part of heat quantity of the heating medium by heating the latter. The first heat quantity supplementing device 74 has a circulating channel for removing the heating medium used for vulcanizing and molding outside from the receiving space of the lower platen 6. The circulating channel has pipes 73a and 73b connected to the supply port 71b and the discharge port 71c, respectively, of the lower platen 6, and a delivery unit 76 such as a fan and a pump connected to one pipe 73b to forcibly sucking and delivering a heating medium. The delivery unit 76 is provided on the supplementing device body 75. The supplementing device body 75 has, in addition to the delivery unit 76, a first heater 77 such as an electromagnetic induction heating heater or a resistance heating heater for heating a heating medium flowing in the circulating channel such as the pipes 73a ad 73b. The first heater 77 is connected to a temperature control device and a power source device not shown, and a driving electric power is controlled so as to control the heating medium to a predetermined temperature.

The first heat quantity supplementing device 74 is fixedly mounted on the upper surface of the base frame 11, as shown in FIG. 1. The lower platen 6 having the first heat quantity supplementing device 74 provided thereon heats the lower side mold 5 in a face-like manner at a predetermined temperature with the heating medium maintained at a predetermined temperature while being circulated by the first heat quantity supplementing device 74. Further, the lower heating mechanism 9 has a platen support 7 for supporting the lower platen 6, and a heat insulating plate 8 interposed between the lower platen 6 and the platen support 7 so that heat of the lower platen 6 is not transmitted to the platen support 7.

The center mechanism 10 extending through the center part of the lower heating mechanism 9 has a lower ring mechanism 12 secured to the lower side mold 5, as shown in FIG. 2. The lower ring mechanism 12 has a lower bead ring 18 formed so as to come in contact with the lower bead part 4c of the green tire 4, a lower. bladder ring 15 provided on the upper surface of the lower bead ring 13 to hold the lower edge of the bladder 20 in cooperation with the lower bead ring 13, and a clamp ring hub 15 provided on the inner peripheral side of the lower bladder ring 14. The clamp ring hub 15 is internally formed with supply- and discharge paths 15a, 15a for causing a pressurized heating medium such as vapor and nitrogen gas to flow. These supply- and discharge paths 15a, 15a are communicated from the upper end surface to the lower end surface of the clamp ring hub 15, and the supply- and discharge paths 15a, 15a at the lower end are connected to a pressurized heating medium supply device not shown through the gas pipes 17a, 17a.

The lower bead ring 13 is internally provided with an annular first induction heating coil 18. To the first induction heating coil 18 is connected a high frequency power source 24 of FIG. 6 for supplying a high frequency electric power. The first induction heating coil 18 induction-heats the bead wire 52 of the lower bead part 4c preferentially by applying an intensive high frequency magnetic field to the lower bead part 4c of the green tire 4 by supply of the high frequency electric power.

In the center part of the lower ring mechanism 12 constructed as described above, a center post 22 is stood upright vertically slidably and in an airtight manner. An upper ring 19 is provided on the upper end part of the center post 22. The upper ring 19 has an upper bladder ring 21, and the upper bladder ring 21 holds an upper edge of the bladder 20. On the other hand, to the lower end of the center post 22 is connected a post elevating mechanism capable of moving up and down the center post 22 to a suitable height position. In the carrying in and out the bladder 20, the post elevating mechanism moves up the center post 22 to the upper limit position so that the upper edge of the bladder 20 is raised to set the bladder 20 to a smaller diameter than a tire hole of the green tire 4. On the other hand, in the vulcanizing and molding the green tire 4, the center post 22 is moved down so that the bladder 20 is enlarged to the diameter capable of coming into contact with the inner wall surface of the green tire 4.

The bladder 20 enlarged and contracted by the center post 22 presses, when the green tire 4 is subjected to vulcanizing and molding, the inner wall surface of the tire in a direction of mold by being supplied with a heating medium, and is provided as a constitutional member formed of a low orientation material which is hard to be deteriorated under the environment of high temperature. The low orientation material is formed to be substantially the same shape as the shaft of the inner wall surface of the tire when the green tire 4 is vulcanized and molded to provide a vulcanized tire. That is, for the bladder 20, as shown in FIG., 6, polyester is employed as a low orientation material that is hard to be deteriorated under the environment of high temperature, and the bladder 20 has a bladder body 20a in which the polyester film is formed into the substantially same shape as the shape of the inner wall surface of the vulcanized tire, and a plurality of magnetic members 20b provided at equal intervals on the surface of the bladder body 20a. The magnetic member 20b is formed form a thin film made of metal (magnetic material) having a magnetism, for example, such as mesh metal, a metal deposited film or the like, and a part corresponding to the tread part 4a of the green tire 4 is formed to have a larger area than other parts. The low orientation material termed herein is a material a having property value of smaller orientation rate than conventional rubber for bladder (for example, butyl rubber) under the environment of high temperature of a vulcanizing temperature, and particularly the orientation rate is preferably in the range of 5% to 15% under the environment of high temperature of 200° C. The reason why it is preferred that the orientation rate is in the range as describe above is that when not greater than 5%, the force for evenly pressing the whole green tire 4 at the time of vulcanizing and molding lowers failing to obtain sufficient mold ability, and when exceeding 15%, it is difficult to vulcanize and mold the green tire 4 with high accuracy similarly to the conventional rubber for bladder (for example, butyl rubber).

Further, the low orientation material which is hard to be deteriorated under the environment of high temperature that can be employed includes, in addition to the aforementioned polyester, knitted goods and woven fabrics using fibers such as nylon, alamide, and paraphenylene benzohisoxisasol (POB), or mesh metal and high density fibers, carbon-contained fibers, metal coated fibers, resin coated fibers and the like, as well as those in which one or more out of these materials are mixed. The forms of mixture include a form of laminated construction in which for example, mesh metal is laminated on a polyester film, or a metal film is deposited on a polyester film, and a form in which a metal coated fiber and a high density fiber are woven while being presented evenly or one-sidedly. There is a further form in which for providing an airtightness, at least one kind of resins such as fluorine and silicon and elastomer is impregnated or coated on a stock such as the aforementioned knitted good and woven fabrics. These forms are suitably selected according to the design specification of the bladder (such as the presence or absence of heat generation caused by induction heating, strength or the like).

A second induction heating coil 23 is arranged internally of the bladder 20. The second induction heating coil 23 is provided around the center post 22, is set to a lower coil height than the distance where the upper bladder ring 21 and the lower bladder ring 14 come closest to each other and is set to a smaller coil diameter than an outside diameter of both the rings 21, 14 so as not to come in contact with the contracted bladder 20. Further, the second induction heating coil 23 is arranged so as not to come in contact with both the rings 21, 14 even if the upper bladder ring 21 is moved down to the lower limit position. A high frequency power source 24 is connected to the second induction heating coil 23, and the second induction heating coil 23 induction heats the magnetic member 20b of the bladder 20 preferentially by applying an intensive high frequency magnetic field to the bladder 20 by supply of high frequency electric power.

A mold elevating part 3 is provided, as shown in FIG. 1, above the center post 22 for enlarging and contracting the bladder 20. The mold elevating part 3 has an upper side mold 25 in contact with an upper side wall 4b' of a green tire 4, a split mold 26 positioned in an outer peripheral direction of a tread part 4a of the green tire 4, a first mold elevating mechanism 27 for elevating the upper side mold 25 and a slide segment 26a of the split mold 26, an upper heating mechanism 28 for heating the upper side mold 25 to a predetermined temperature, a second mold elevating mechanism 29 for elevating the upper heating mechanism 28 and a fixed segment 26b of the split mold 26, and a support member 30 for supporting these mechanisms 27 to 29.

The upper heating mechanism 28 has a disk-shaped upper platen 32, a platen support 33 for supporting the upper platen 32, and a heat insulating plate 34 interposed between the upper platen 32 and the platen support 33 so that heat of the upper platen 32 is not transmitted to the platen support 33. The upper plate 32 has the same constitution as the lower platen 6 having a receiving space of a heating medium therein by joining platen body 71 with a lid T72. The upper platen 32 is provided with a second heat quantity supplementing device 78 having the same constitution as the first heat quantity supplementing device 74, the second heat quantity supplementing device 78 being supported on the platen support 33 through a support member 79, as shown in FIG. 2. The upper platen 32 provided on the second heat quantity supplementing device 78 heats the upper side mold 25 in a face-like manner at a predetermined temperature by the way in which the heating medium is maintained at a predetermined temperature while being circulated.

Figure 6:
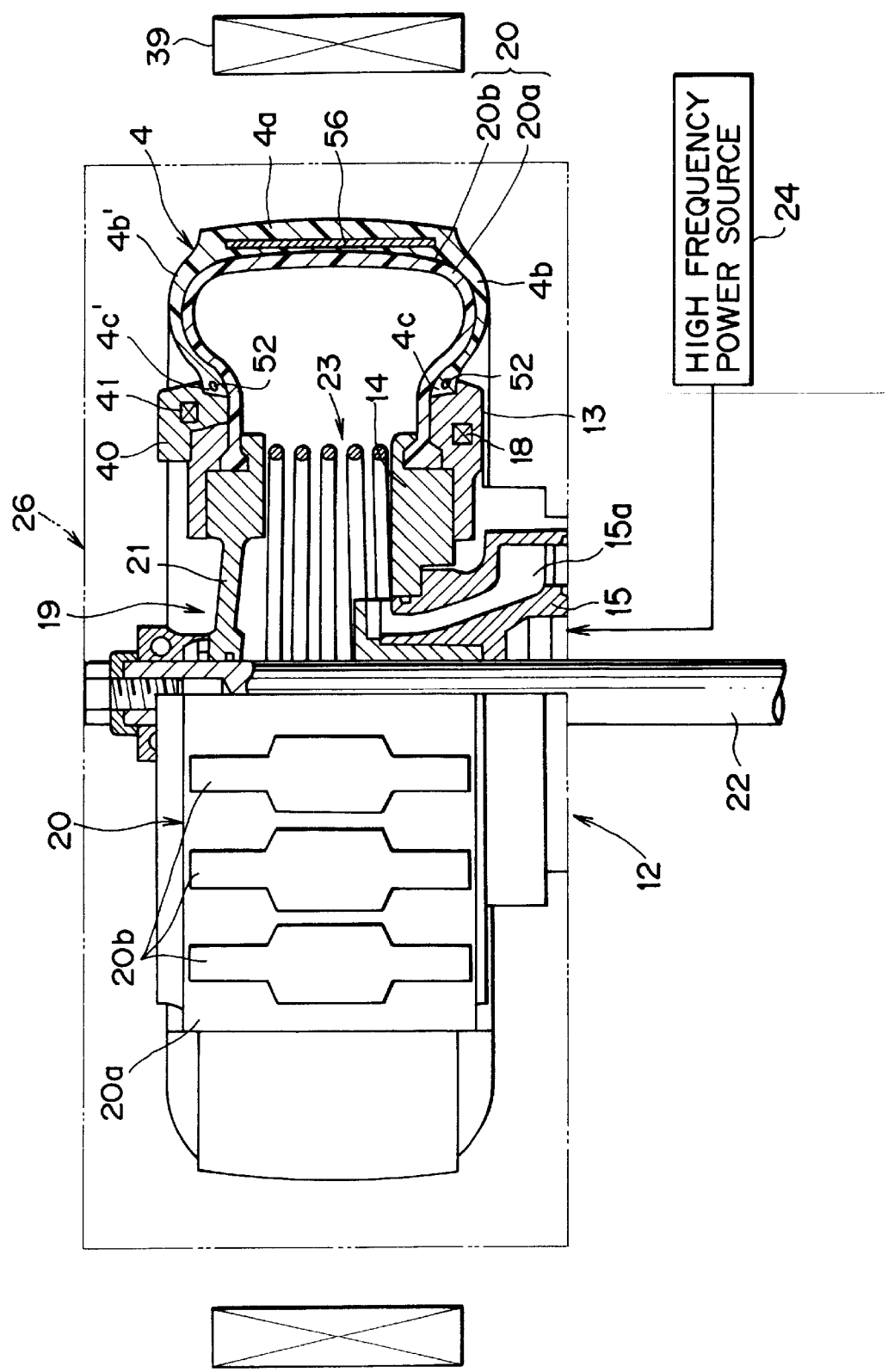
FIG. 6 is an explanatory view showing a state for carrying out vulcanizing and molding.

A rod-like member 35 of the first mold elevating mechanism 27 is extended through vertically movably the center part of the upper heating mechanism 28. A disk-shaped slide plate 36 is provided at the lower end of the rod-like member 35. The upper side mold 25 is fixedly mounted on the center side in the center part of the lower surface of the slide plate 36. An upper bead ring 40 formed so as to come in contact with the upper bead part 4c' of the green tire 4 is provided in the inner peripheral part of the upper side mold 25. The upper bead ring 40 is internally provided with an annular third induction heating coil 41. A high frequency power source 24 shown in FIG. 6 is connected to the third induction heating coil 41, and the third induction heating coil 41 induction heats the bead wire 52 of the upper bead part 4c preferentially by applying an intensive high frequency magnetic field to the upper bead part 4c' of the green tire 4 by a supply of high frequency electric power.

A plurality of slide segments 26a formed of a nonmagnetic material such as aluminum are provided on the outer peripheral part of the lower surface of the slide plate 36. Each slide segment 26a is provided with a tread mold 26a' formed so as to come in contact with the tread part 4a of the green tire 4, and the segments 26a are arranged at equal intervals on the concentric circle about the upper side mold 25 and are engaged with the slide plate 36 movably in the center direction. A fixed ring 26b formed of a nonmagnetic material is arranged outside the slide segment 26a. The fixed ring 26b is fixedly mounted on the peripheral edge of the lower surface of the upper platen 32 so as to radially move forward and backward the slide segment 26a while engaging the outer surface of the slide segment 26a. The tread mold 26a' of the slide segment 26a forms a cylindrical mold corresponding to the tread part 4a of the green tire 4 when the former is moved in the center direction by the fixed ring 26b.

The fixed ring 26b is internally formed with a receiving space 26c of a heating medium, and is provided with a third heat quantity supplementing device 80 having the same constitution as the first heat quantity supplementing device 74. The third heat quantity supplementing device 80 is supported on a platen support 83 through a support member 79, and pipes 73a, 73b are connected to the receiving space 26c within the fixed ring 26b. The fixed ring 26b in which the third heat quantity supplementing device 80 is provided heats the tread mold 26a of the slide segment 26a at a predetermined temperature by the way in which the heating medium is maintained at a predetermined temperature while being circulated.

On the other hand, the upper end of the rod-like member 36 is connected to a first cylinder member 37, as shown in FIG. 1. The first cylinder member 37 is supported by an insert part 33a raised from the center part of the upper surface of the platen support 33. Thereby, the first mold elevating mechanism 27 having the first cylinder member 37 or the like is capable of elevating the slide plate 36 (the upper side mold 25, the slide segment 26a) through the rod-like member 35 independently of the support member 30 and the upper heating mechanism 28.

In the insert part 33a supporting the first cylinder member 37, the rod-like member 35 is movably inserted, and the support member is movably inserted. On both sides of the insert part 33a, a pair of left and right second mold elevating mechanisms 29 are arranged. Each second mold elevating mechanism 29 has a second cylinder member 38 fixedly mounted on the upper surface of the support member 30, and in the second cylinder member 38, the extreme end of the cylinder rod 38a is connected to he platen support 33 so as to elevate the upper heating mechanism 28.

A cylindrical shield member 31 raised from the peripheral edge of the support member 30 is arranged in the outer peripheral direction of the upper heating mechanism 28 and the split mold 26 constituted as described above. A fourth induction heating coil 39 is provided between the shield member 31 and the split mold 26. A high frequency power source 24 of FIG. 6 is connected to the fourth induction heating coil 39, and the fourth induction heating coil 39 induction heats the belt member 56 of the tread part 4a preferentially by applying an intensive high frequency magnetic field to the tread part 4a of the green tire 4 by a supply of high frequency power.

In the above-described constitution, the operation of the vulcanizer 1 will be explained. First, the mold elevating part 8 is moved upward to thereby position the mold elevating portion 3 above the mold fixing part 2. Afterward, the green tire 4 is carried between the mold fixing part 2 and the mold elevating part 3 by the carrying device 43. When the tire hole of the green tire 4 is positioned above the center post 22, the center post 22 of the center mechanism 10 is moved upward, as shown in FIG. 2, whereby the upper edge of the bladder 20 is raised through the upper ring 19 to reduce the bladder 20 to a diameter smaller than the tire hole of the green tire 4. Then, the green tire 4 is moved down, and the green tire 4 is placed on the lower side mold 5 while inserting the center post 22 and the bladder 20 into the tire hole of the green tire 4.

Figure 3:
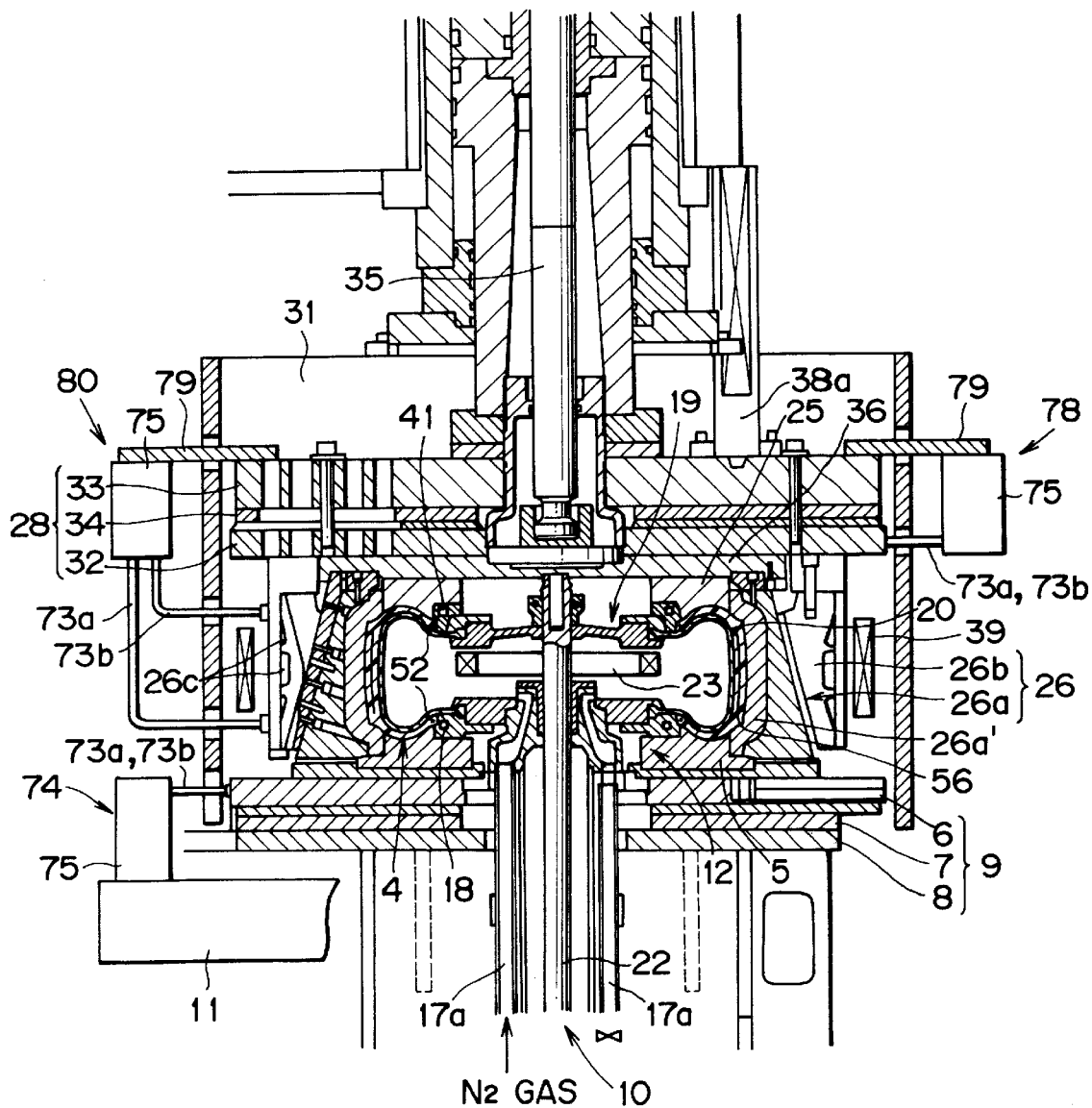
FIG. 3 is an explanatory view showing a clamping state.

Subsequently, the cylinder rod 38a is moved forward from the second cylinder member 38, and the rod-like member 35 is moved forward from the first cylinder member 37, whereby the upper heating mechanism 28 and the slide plate 36 are moved down and separated, and the slide segment 26a is moved in the outer peripheral direction. As shown by the two-dot chain line shown, the mold elevating part 3 is moved down while maintaining the separating state of the upper heating mechanism 28 and the slide plate 36 to position the green tire 4 on the inner peripheral side of the slide segment 26a, after which the slide segment 26a is moved in the center direction by the fixed ring 26b. As shown in FIG. 3, the slide segments 26a are brought into contact with each other to form the cylindrical mold corresponding to the tread part 4a of the tire 4, and the upper side mold 25 and the lower side mold 5 are brought into contact with the upper part and the lower part, respectively, of the mold to complete clamping.

Figure 4A:
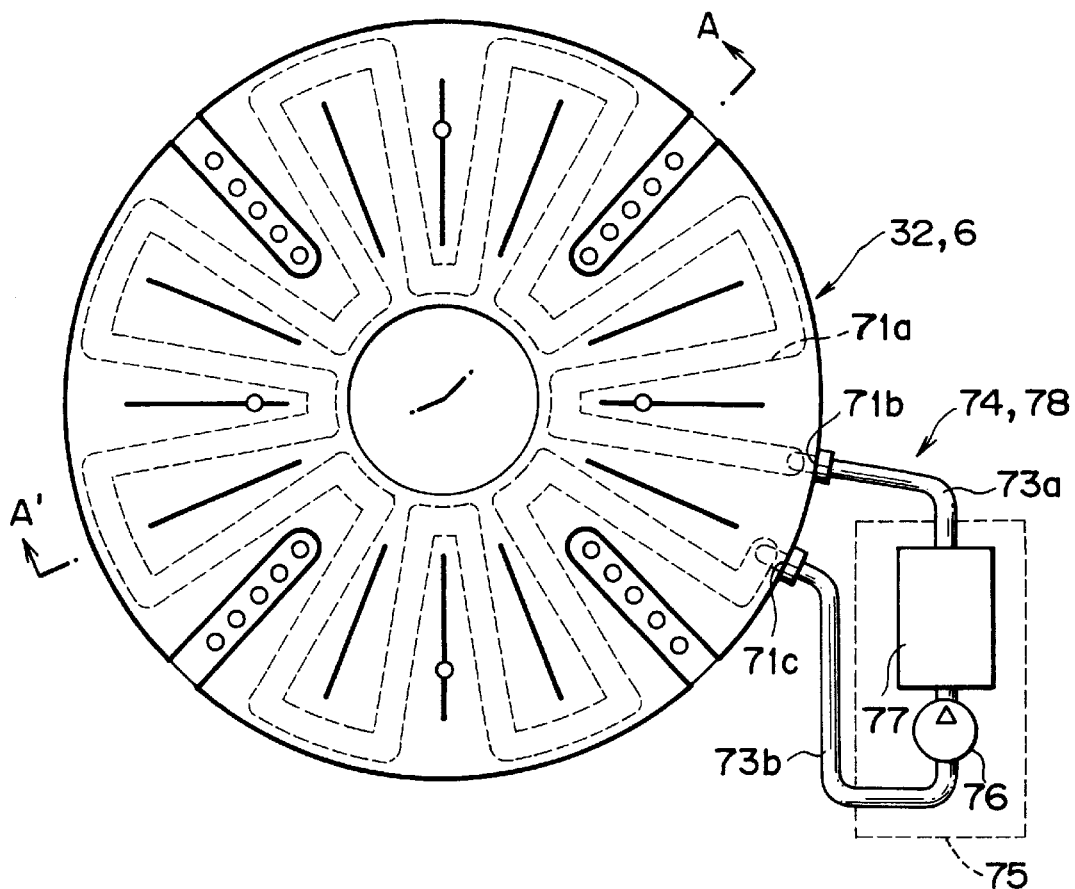
FIG. 4A is a schematic constitutional view of a platen and a heat quantity supplementing device.
Figure 4B:
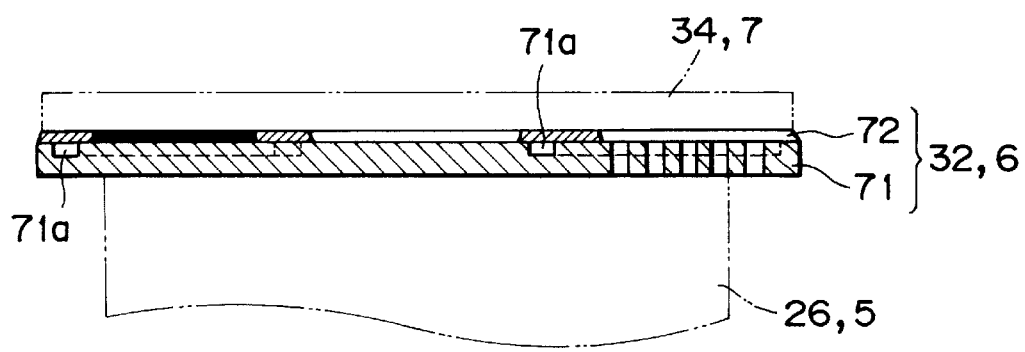
FIG. 4B is a sectional view taken on line A—A of FIG. 4A.

The tire molds 26a', 25, 5 raise the lower platen 6, the upper platen 82 and the fixed ring 26b of the split mold 26 to the desired temperature by the first to third heat quantity supplementing devices 74, 78, 80. That is, in the first heat quantity supplementing device 74 and the second heat quantity supplementing device 78, the heating medium is circulated between the platens 32, 6 and the heat quantity supplementing devices 74, 78, by a series of operations that as shown in FIG. 4, the delivery unit 76 is operated whereby the beating medium in the platens 32, 6 is removed from the discharge port 71c outside through the pipe 73b, and is passed through the first heater 77 in the supplementing device body 75, after which the heating medium is sent into the platens 32, 6 from the supply port 71b through the other pipe 73a.

Thereafter, a driving power is supplied to the first heater 77 to generate the first heater 77 and heat the heating medium passing through the first heater 77. The temperature of the heating medium is detected by a temperature detector not shown, and when the heating medium assumes the desired temperature, the supply power to the first heater 77 is controlled so as to supplement the lost part of heat quantity caused by the radiation during the circulation and the reduced part of heat quantity caused by vulcanizing to thereby maintain the heating medium at the desired temperature. In the third heat quantity supplementing device 80, the heating medium is heated while being circulated between the fixed ring 26b and the third heat quantity supplementing device 80 by the operation similar to that mentioned above to the desired temperature, as shown in FIG. 3.

When the first to third heat quantity supplementing devices 74, 78, 80 are operated as described above, and the lower platen 6, the upper platen 32, and the fixed ring 26b are heated to the desired temperature by the heating medium, the platens 6, 32 heat the upper and lower side molds 25, 5, respectively, and the fixed ring 26b heats the tread mold 26a' of the slide segment 26a. The green tire 4 is heated from the outside by these molds 25, 5, 26a.

Substantially simultaneously with operation of the first to third heat quantity supplementing devices 74, 78 and 80, a heating pressure medium such as high temperature and high pressure vapor or nitrogen gas is supplied into the bladder 20 through the pipe 17a to move forward the bladder 20 into close contact with the inner wall surface of the green tire 4 to press the green tire in a direction of mold. The heat quantity of the high temperature and high pressure pressure-medium is transmitted to the green tire 4 through the bladder 20 to thereby heat the green tire 4 from the inner surface side.

As shown in FIG. 6, the high frequency power is supplied from the high frequency power source 24 to the induction heating coils 18, 28, 41, and 39. The first induction heating coil 18 and the third induction heating coil 41 supplied with the high frequency power preferentially induction heat the bead wires 52, 52 provided internally of the bead parts 4c, 4c' by applying an intensive high frequency magnetic field to the lower bead part 4c and the upper bead part 4c' of the green tire 4. Further, the fourth induction heating coil 39 preferentially induction heats the belt member 56 provided internally of the tread part 4a by applying an intensive high frequency magnetic field to the tread part 48 of the green tire 4, since the split mold 26 is formed of a non-magnetic material and is divided in the circumferential direction. Thereby, because of, in addition to the heating from the outer surface side and the inner surface side of the green tire 4, the heating accomplished from the inner part of the tire in the bead parts 4c, 4c' and the tread part 4a having a great wall-thickness, the whole tire is raised to the desired vulcanizing temperature in a short period of time.

The induction heating coil 23 supplied with the high frequency power causes the bladder 20 itself to generate heat by applying an intensive high frequency magnetic field to the magnetic member 20b of the bladder 20. Accordingly, when the heat quantity of the pressure medium is transmitted to the green tire 4 through the bladder 20, the delay in transmission time of the heat quantity by the bladder 20 is suppressed to the minimum, and therefore, the green tire 4 is raised to the vulcanizing temperature in a further shorter period of time. Particularly, since the magnetic member 20b of the bladder 20 is formed so that the part corresponding to the tread part 4a has a larger area than that of the other parts, the temperature rise in the tread part 4a of the green tire 4 is conspicuous. During the vulcanizing and molding of the green tire 4, the bladder 20 carries out molding of the green tire 4 by pressing the green tire 4 toward the mold. At that time, since the bladder 20 is formed of a low orientation material having substantially the same shape as the shape of the inner wall surface of the vulcanized tire, even if the pressure of the pressure medium is somewhat varied, the shape of the inner wall surface of the vulcanized tire can be realized positively. Accordingly, when the green tire 4 is pressed and molded by the bladder 20, the vulcanized tire molded with accuracy can be obtained.

When the vulcanized tire is obtained as described above, as shown in FIG. 2, the mold is opened by the operation reversed to the former, after which the bladder 20 is contracted, and the vulcanized tire is held by the carrying out device and carried out to the outside. Thereafter, a new green tire 4 is carried in to repeat the vulcanizing and molding. Even if such vulcanizing and molding is repeated, since the low orientation material of the bladder 20 is hard to be deteriorated under the environment of high temperature, the low orientation material maintains its initial property. Accordingly, even if the repeating frequency of the vulcanizing and molding is increased, the bladder 20 positively realizes the shape of the inner wall surface of the vulcanized tire, thus enabling the use of the bladder 20 for a long period of time.

As described above, the vulcanizer 1 according to the present embodiment comprises, as shown in FIG. 1, the vulcanizer body provided with the molds 25, 5, 26a and the platens 6, 32 used for heating, vulcanizing and molding the green tire 4 by making use of the heat quantity of the heating medium, and repetitiously heating the heating medium used for vulcanizing and molding, and the fixed ring 26b, and the first to third heat quantity supplementing devices 74, 78, 80 (heat quantity supplementing means) for supplementing a lost part of the heating medium by heating the heating medium.

According to the above-described constitution, the first to third heat quantity supplementing devices 74, 78, 80 have supplemented the lost part of heat quantity with respect to the heating medium used for vulcanizing and molding, and afterward, the heating medium is repetitiously used for heating the green tire 4 charged into the molds 25, 5, 26a of the vulcanizer body. Therefore, it is not necessary to receive a supply of the heating medium through the pipe from the boiler disposed in a place separately from the vulcanizer, as in prior art. Accordingly, no energy loss caused by the radiation of the pipe during supplying occurs, because of which vulcanizing and molding can be carried out with less energy loss of the heating medium. Further, since the boiler and the pipe are not necessary, the vulcanizer 1 can be transferred easily, and the vulcanizing facilities can be newly installed at less cost.

In the present embodiment, the first to third heat quantity supplementing devices 74, 78, 80 comprise a circulating channel such as the pipes 73a, 73b and the delivery unit 76 for removing the heating medium used for vulcanizing and molding outside from the platens 6, 32 and the fixed ring 26b of the vulcanizer body to return it to the original place, and the first heater 77 for heating the heating medium flowing the circulating channel. Thereby, the first to third heat quantity supplementing devices 74, 78, 80 provided with the circulating channel and the first heater 77 are assembled separately from the vulcanizer body, and thereafter can be mounted on the vulcanizer body, whereby it can be mounted also on the existing vulcanizer body.

Figure 7:
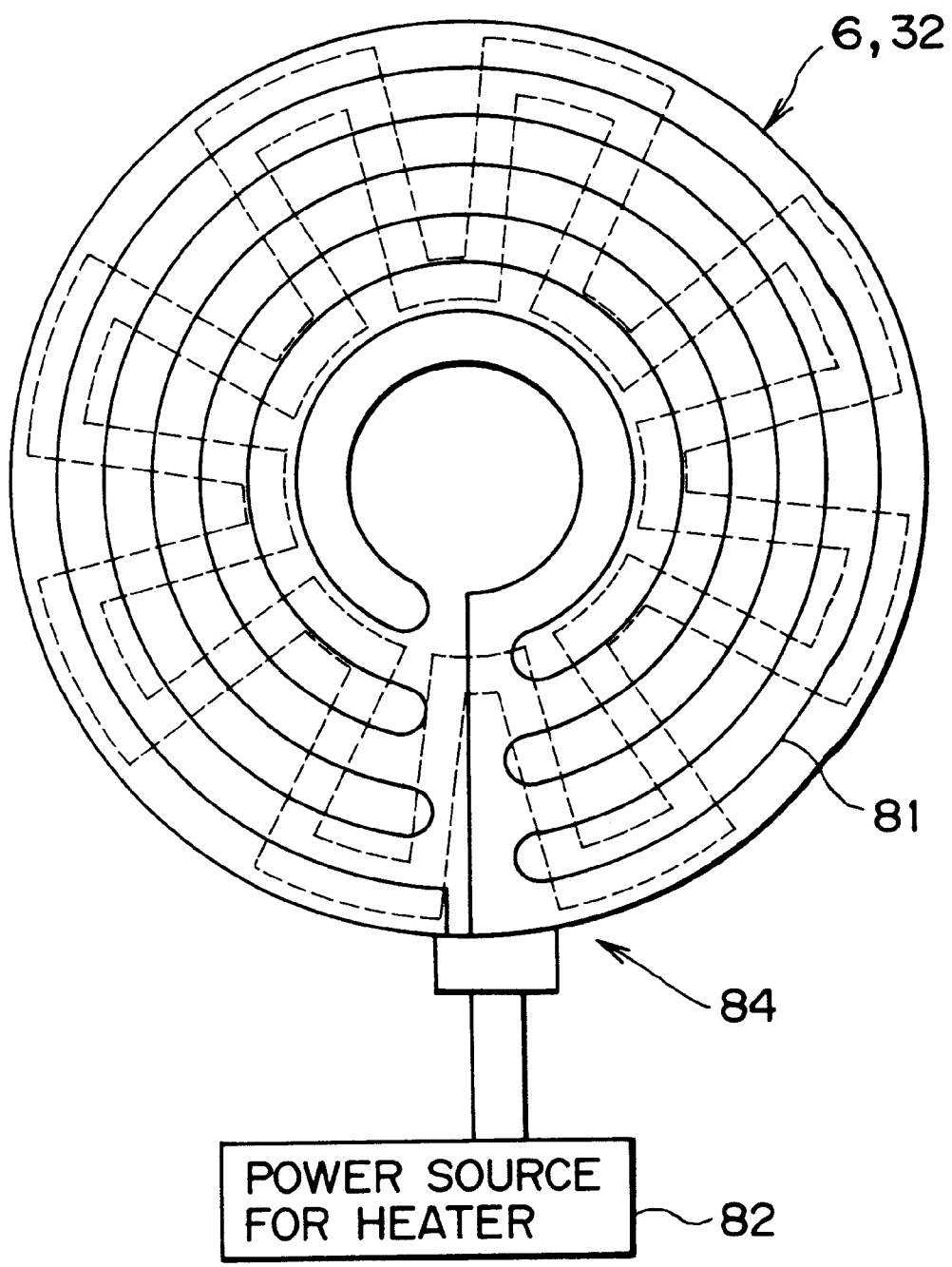
FIG. 7 is an explanatory view showing a schematic constitution of a platen and a heat quantity supplementing device.

In the vulcanizer 1 according to the present embodiment, while the heating medium is heated by the first to third heat quantity supplementing devices 74, 78, 89 constituted so as to take out the heating medium to the outside from the vulcanizer body (platens 6, 32), and to heat it, after which the medium is returned to the original place, it is noted that the vulcanizer is not limited thereto. That is, the vulcanizer 1 may be provided with the fourth heat quantity supplementing device 84 (heat quantity supplementing means) which is designed so that as shown in FIG. 7, the linear second heaters 81 are joined so as to be distributed evenly to the plate surfaces (upper surface and lower surface) of the platens 6, 32 (platen means), and the heating medium is heated by the second heaters 81 through the diaphragms of the platens 6, 32. In this case, if the second heater 81 is generated in heat by a supply of power from the power source for heater 82, heating can be accomplished without taking out the heating medium in the platens 6, 32, whereby the heating medium can be heated efficiently to supplement the lost part of heat quantity.

Figure 8:
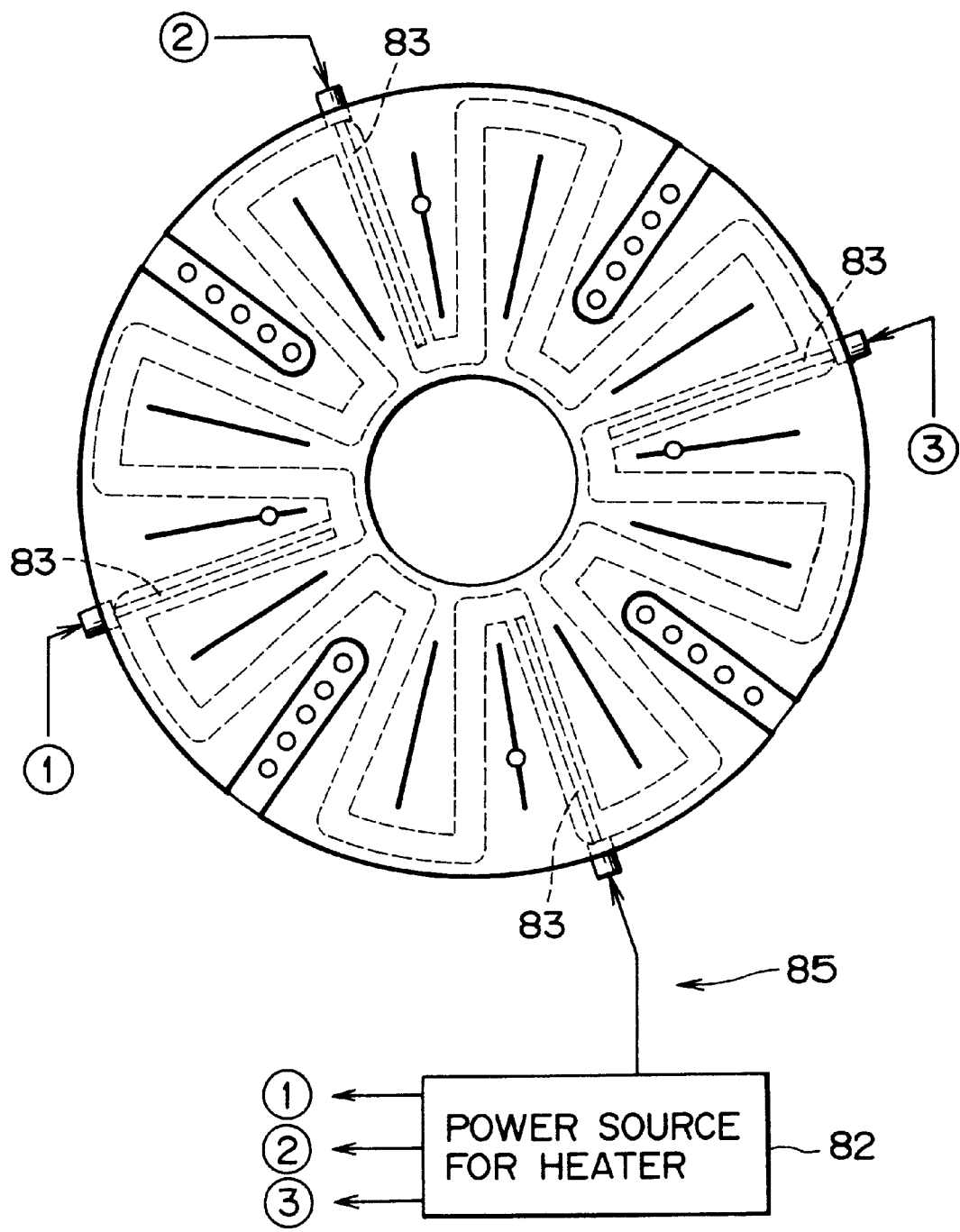
FIG. 8 is an explanatory view showing a schematic constitution of a platen and a heat quantity supplementing device.
Figure 9:
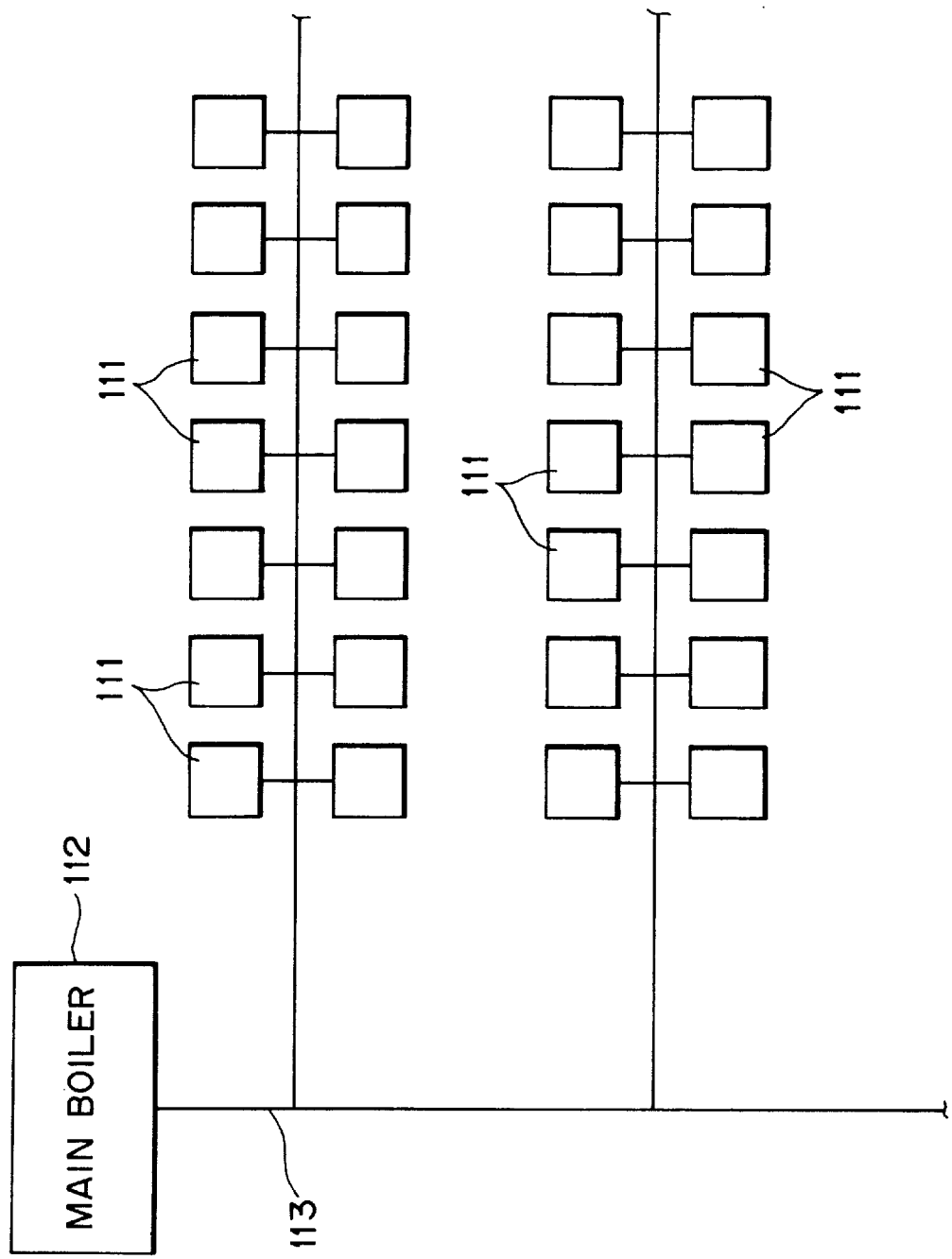
FIG. 9 is an explanatory view showing a piping channel for vapor in a conventional vulcanizer.

The vulcanizer 1 may be provided with the fifth heat quantity supplementing device 85 (heat quantity supplementing means) which is designed so that as shown in FIG. 8, a plurality of rod-like heaters 83 are provided in a receiving space of the heating medium in the platens 6, 32, and the heating medium is heated directly by the eighth heaters 83. In this case, if the eighth heaters 83 are generated in heat by a supply of power from the power source for heater 82, the heating medium in the platens 6, 32 can be heated directly the eighth heaters 83, whereby the heating medium can be heated very efficiently to supplement the lost by of heat quantity.

What is claimed is:

1. A vulcanizer comprising:
   a vulcanizer body including a mold into which said green tire is charged, said mold including a segmental mold,
   a heating medium applied to said mold including said segmental mold to vulcanize the green tire; and
   heat quantity supplementing means for heating said heating medium to thereby supplement a lost part of a heat quantity of said heating medium,
   wherein said heat quantity supplementing means comprises a circulating channel for taking out the heating medium used for vulcanizing to outside said vulcanizer body, and a first heater provided in said circulating channel to supplement a lost part of the heat quantity of said heating medium by heating the heating medium flowing in said circulating channel.

2. The vulcanizer according to claim 1, wherein said vulcanizer body has a platen plate for heating said mold by receiving said heating medium therein; and said heat quantity supplementing means has a second heater joined to said platen plate to heat the heating medium through a diaphragm of said platen plate.

3. The vulcanizer according to claim 1, wherein said vulcanizer body has a platen plate for heating said mold by receiving said heating medium therein; and said heat quantity supplementing means has a third heater provided within a receiving space of said heating medium in said platen plate to heat the heating medium directly.

4. The vulcanizer according to claim 1, wherein said vulcanizer body has a bladder for pressing the inner wall surface of said green tire in a direction of said mold when said green tire is vulcanized and molded, said bladder being formed of a low orientation material.

5. The vulcanizer according to claim 1, wherein said segmental mold comprises a fixed ring, and said heating medium heats said fixed ring to a desired temperature.

6. The vulcanizer according to claim 1, further comprising an induction heating coil provided in an outer peripheral direction of said segmental mold.

7. A vulcanizer comprising:
   a vulcanizer body for heating a green tire by making use of a heat quantity of a heating medium to thereby heat, vulcanize and mold the green tire;
   a mold into which said green tire is charged;
   an upper platen plate for receiving said heating medium to thereby heat said mold from the upper side;
   a lower platen plate for receiving said heating medium to thereby heat said mold from the lower side;
   a first heat quantity supplementing means for raising said upper platen plate to the desired temperature;
   a second heat quantity supplementing means for raising said lower platen plate to the desired temperature;
   a circulating channel for taking out the heating medium used for vulcanizing and molding to the outside from said vulcanizer body; and
   a heater provided in said circulating channel to heat the heating medium flowing in said circulating channel.

8. The vulcanizer according to claim 7, wherein said mold comprises an upper side mold, a lower side mold, and a segmental mold, further comprising a third heat quantity supplementing means for raising a fixed ring provided on said segmental mold to the desired temperature, said third heat quantity supplementing means comprising a further circulating channel for taking out the heating medium used for vulcanizing and molding to outside from said vulcanizer body, and a heater provided in said further circulating channel to supplement a lost part of the heat quantity of said heating medium by heating the heating medium flowing in said further circulating channel.

9. The vulcanizer according to claim 8, wherein an induction heating coil is provided in the outer peripheral direction of the segmental mold.

10. The vulcanizer according to claim 7, comprising a heater joined to said upper platen plate and said lower platen plate to heat the heating medium through a diaphragm of said platen plate.

11. The vulcanizer according to claim 7, wherein said first and second heat quantity supplementing means has a heater provided within the receiving space of said heating medium in said platen plate to heat the heating medium directly.

12. The vulcanizer according to claim 7, comprising a bladder for pressing the inner wall surface of the green tire in a direction of said mold when said green tire is vulcanized and molded, said bladder being formed of a low orientation material.

13. The vulcanizer according to claim 12, comprising a plurality of magnetic members on the surface of said bladder.

14. The vulcanizer according to claim 12, wherein an induction heating coil is arranged internally of said bladder.

* * * * *